Figure 1:
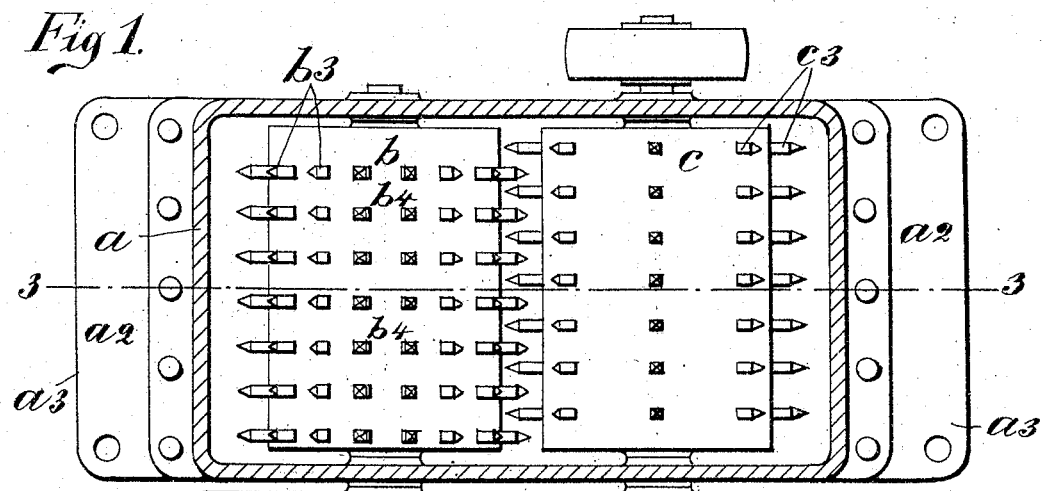

No. 778,372. PATENTED DEC. 27, 1904.
G. W. PERRY.
COAL CRUSHER.
APPLICATION FILED JUNE 15, 1904.

WITNESSES
F. A. Stewart
C. E. Mulreany

INVENTOR
George W. Perry,
Edgar Tate & Co
BY ATTORNEYS

No. 778,372. Patented December 27, 1904.

UNITED STATES PATENT OFFICE.

GEORGE W. PERRY, OF TUSCARORA, PENNSYLVANIA.

COAL-CRUSHER.

SPECIFICATION forming part of Letters Patent No. 778,372, dated December 27, 1904.

Application filed June 15, 1904. Serial No. 212,615.

*To all whom it may concern:*

Be it known that I, GEORGE W. PERRY, a citizen of the United States, residing at Tuscarora, in the county of Schuylkill and State of Pennsylvania, have invented certain new and useful Improvements in Coal-Crushers, of which the following is a specification, such as will enable those skilled in the art to which it appertains to make and use the same.

The object of this invention is to provide a coal-crusher involving the usual casing of any preferred construction and rollers mounted therein and geared in connection so that one of said rollers will turn through two revolutions while the other is turning through but one, said rollers being of the same or substantially the same diameter and being provided with teeth arranged in longitudinal and transverse rows, the rows of teeth on the roller having the least number of revolutions being twice the number of the rows of teeth on the other roller, whereby the operation of the said teeth of said rollers is facilitated in the process of crushing or feeding the coal therethrough; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 2:
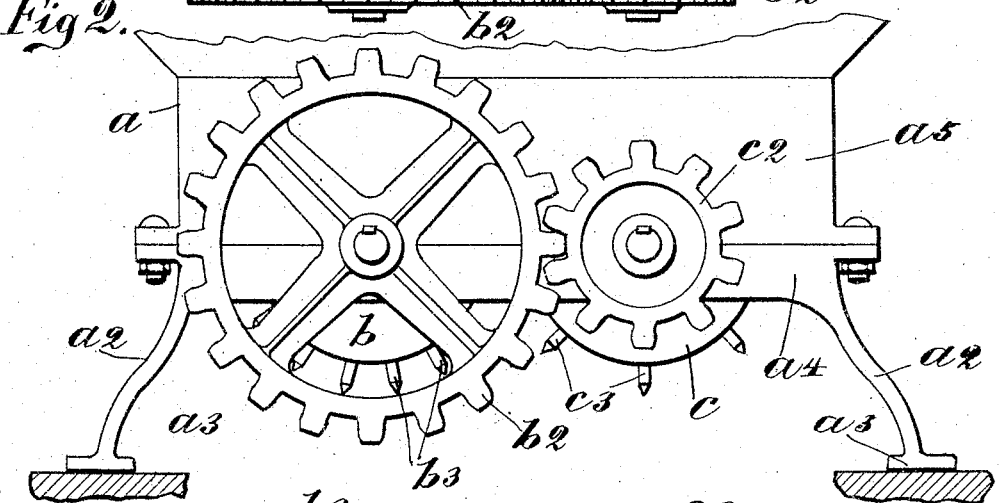
Figure 3:
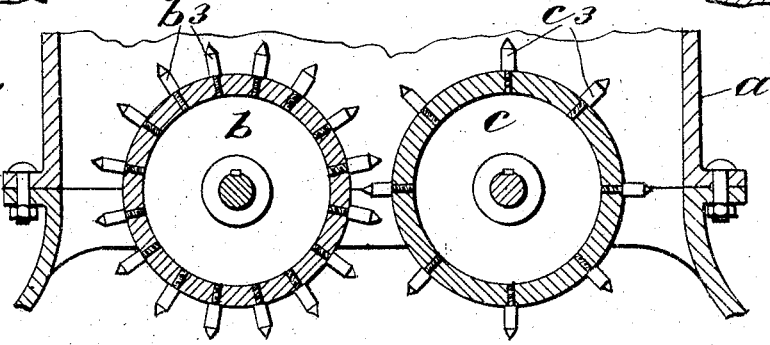

Figure 1 is a plan view of my improved coal-crusher, the casing being shown in section; Fig. 2, a side view thereof, and Fig. 3 a transverse vertical section on the line 3 3 of Fig. 1.

In the practice of my invention I provide a suitable frame or casing $a$, which is oblong and rectangular in form, and which in the form of construction shown is supported by legs $a^2$, which rest on any suitable base or support $a^3$. In the form of construction shown the frame or casing $a$ comprises a bottom portion $a^4$ and a top portion $a^5$; but this frame or casing may be of any desired construction and of any preferred form.

Mounted in the frame or casing $a$ are two rollers $b$ and $c$, which are in the form of construction shown of the same transverse diameter, and these rollers are geared in connection at one end by means of gear-wheels $b^2$ and $c^2$, the respective diameters of which are such that the roller $c$ will turn through two revolutions, while the roller $b$ will turn through but one revolution. The roller $b$ is provided with a plurality of teeth $b^3$, arranged in longitudinal and transverse rows, and the roller $c$ is provided with a plurality of teeth $c^3$, also arranged in longitudinal and transverse rows, and the longitudinal rows of teeth $c^3$ on the roller $c$ are one-half the number of the longitudinal rows of teeth $b^3$ on the roller $b$. The distance between the teeth $b^3$ on the roller $b$, both in the longitudinal and transverse rows, is such that four of said teeth form a square, as shown at $b^4$, and the arrangement of the teeth $c^3$ on the roller $c$ is such that when the said rollers are turned the teeth $c^3$ on the roller $c$ will enter the spaces or squares $b^4$ of the roller $b$ and point directly toward the centers of said spaces or squares when the teeth of the roller $c$ project horizontally toward the roller $b$.

It will be understood that the coal is fed into the crusher in the usual manner and by any suitable means, and by reason of the arrangement of teeth on the rollers $b$ and $c$ the coal is carried through or between said rollers and crushed or broken into fine pieces or particles, the dimensions of which will depend on the arrangement of the teeth on the rollers $b$ and $c$ or the spaces between the same. This arrangement of the teeth on the rollers $b$ and $c$ also facilitates the operation of forcing the coal between the rollers and preventing the same from becoming packed between the teeth thereof, and particularly between the teeth of the roller $b$.

Having fully described my invention, what I claim as new, and desire to secure by Letters Patent, is—

1. A coal-crusher, comprising a suitable casing open at the top and bottom and two rollers mounted therein in the same horizontal plane and geared in connection so that one of said rollers will revolve twice as fast as the other, each of said rollers being provided with teeth arranged in longitudinal and transverse rows, the longitudinal rows of teeth on the roller which revolves most rapidly being twice the number of those on the other roller, substantially as shown and described.

2. A coal-crusher, comprising a suitable frame or casing open at the top and bottom and two rollers mounted therein in the same horizontal plane and geared in connection so that one will revolve more rapidly than the other, each of said rollers being provided with teeth arranged in longitudinal and transverse rows, the rows of teeth on the roller which revolves most rapidly being half those on the other roller, all of the teeth on each of the rollers being the same distance apart longitudinally of the rollers, and the teeth on the roller which revolves most slowly being so placed as to form regular spaces or squares into which the teeth of the other roller project as said rollers are turned, substantially as shown and described.

In testimony that I claim the foregoing as my invention I have signed my name, in presence of the subscribing witnesses, this 13th day of June, 1904.

GEORGE W. PERRY.

Witnesses:
H. K. WESTON,
HORACE J. WESTON.